United States Patent
Pan et al.

(10) Patent No.: US 9,614,952 B2
(45) Date of Patent: Apr. 4, 2017

(54) WIRELESS ALERTING SYSTEM FOR PERSONAL AREA ASSET SUPERVISION

(71) Applicant: Salutica Allied Solutions SDN. BHD., Lahat, Ipoh (MY)

(72) Inventors: Yoon Shing Pan, Ipoh (MY); Kean Hoo Chong, Ipoh (MY); Wee Yeoh Tan, Ipoh (MY); Chang Tih Ho, Ipoh (MY)

(73) Assignee: SALUTICA ALLIED SOLUTIONS SDN. BHD., Lahat, Ipoh, Perak (MY)

( * ) Notice: Subject to any disclaimer, the term of this patent is extended or adjusted under 35 U.S.C. 154(b) by 0 days.

(21) Appl. No.: 14/410,138

(22) PCT Filed: Jan. 31, 2013

(86) PCT No.: PCT/MY2013/000016
§ 371 (c)(1),
(2) Date: Jan. 9, 2015

(87) PCT Pub. No.: WO2013/191527
PCT Pub. Date: Dec. 27, 2013

(65) Prior Publication Data
US 2015/0222740 A1    Aug. 6, 2015

(30) Foreign Application Priority Data
Jun. 22, 2012  (MY) .......................... PI 2012700414

(51) Int. Cl.
| H04M 3/00 | (2006.01) |
| H04M 1/725 | (2006.01) |
| H04W 4/00 | (2009.01) |
| H04W 4/02 | (2009.01) |
| H04W 8/26 | (2009.01) |

(Continued)

(52) U.S. Cl.
CPC ...... *H04M 1/7253* (2013.01); *G08B 21/0275* (2013.01); *G08B 21/0277* (2013.01); *H04M 1/72572* (2013.01); *H04W 4/008* (2013.01); *H04W 4/023* (2013.01); *H04W 8/26* (2013.01); *H04W 60/04* (2013.01); *G08B 21/0269* (2013.01)

(58) Field of Classification Search
USPC ....................................................... 455/420
See application file for complete search history.

(56) References Cited

U.S. PATENT DOCUMENTS

2010/0253506 A1   10/2010   Teran-Matus et al.
2011/0012743 A1*  1/2011   Van Gorp .............. G08C 17/02
                                                                340/686.6

(Continued)

FOREIGN PATENT DOCUMENTS

KR      1020090118761      11/2009

*Primary Examiner* — Martin Mushambo
(74) *Attorney, Agent, or Firm* — Sand & Sebolt

(57) ABSTRACT

The present invention relates to a wireless alerting system for personal area asset supervision, the system includes an observing device, using a host apparatus such as Bluetooth, capable of monitoring at least one identifier device located within a selected proximity which encompasses an area in a selected radius of distance; wherein the observing device provides infrastructure for the system including power supply and a user interface; and wherein the identifier device is a generic tag or customized to some extent in the system for attachment to any item.

16 Claims, 5 Drawing Sheets

(51) Int. Cl.
*H04W 60/04* (2009.01)
*G08B 21/02* (2006.01)

(56) References Cited

U.S. PATENT DOCUMENTS

2011/0279273 A1 11/2011 Warren
2012/0154144 A1 6/2012 Betts et al.

* cited by examiner

WIRELESS ALERTING SYSTEM FOR PERSONAL AREA ASSET SUPERVISION

FIELD OF INVENTION

The present invention relates generally to a smart alerting system with safe zone, and more particularly to a wireless alerting system for personal area asset supervision.

BACKGROUND OF INVENTION

Portable communication systems and devices have been integrated into many facets of daily life and are now commonly carried by person or user throughout the day. These devices include cellular telephones, smartphones, and portable digital assistance including laptop, tablet computer, as well as messaging devices which are in association with specific applications in the systems. The devices are generally connected to a mobile communication network, through which the devices receive and send notifications by using preinstalled application or software in the systems. When a notification is received, the devices provide audio, for example, ringtones or chimes, or motion feedback such as vibration to notify the user.

One existing systems is to alert the user by portable communication device, such as smart phone, through its ring tone or vibration when the device is moving away from certain distance from an item. The item may be, for example, but not limited to a personal belonging, pet, children, etc. which may need to be monitored within a specific distance from the user. However, it is to be found that the existing alerting system and device often continually alerting the user whenever the device is away in certain distance from the item even if it is within a "safe zone". The "safe zone" as defined herein is a perimeter of area that the user knows the item is well kept and monitored, and the user does not want the alerting device to alert when the user moves in certain distance away from the item, but within the perimeter of area.

In view of these and other shortcomings of the existing art, it would be useful and advantageous to provide an improved smart alerting system for safe zone. Accordingly, the present invention provides an improved wireless alerting system for personal area asset supervision, wherein system enables the user to predefine the perimeter distance or perimeter of area in accordance with the user requirements.

SUMMARY OF THE INVENTION

The present invention relates to a wireless alerting system for personal area asset supervision. The system includes an observing device, using a host apparatus such as Bluetooth, capable of monitoring at least one identifier device located within a selected proximity which encompasses an area in a selected radius of distance; wherein the observing device provides infrastructure for the system including power supply and a user interface; and wherein the identifier device is a generic tag or customized to some extent in the system for attachment to any item.

In accordance with preferred embodiments of the present invention, the observing device is a Bluetooth-enabled cellular phone, smart phone, laptop, tablet computer or the like. The user interface of the observing device includes one or more of visual monitor or display, audible signal, or mechanical vibration signal.

The system further includes software capabilities provided in the observing device and/or identifier device for managing, monitoring and alerting features within the system.

Accordingly, the system involves using an application (named as NODE-APP) and a specific identifier (named as NODE) which are connected and in communication to each other using Bluetooth technology.

Accordingly, the system is implemented as a set of software instruction through observing device residing with the host apparatus such as Bluetooth.

In the preferred embodiments, the NODE is in communication with the observing device using the Bluetooth technology of version 2.0 or above.

It will be appreciated that any associated identifier device i.e. tag can be searched or tracked within a selected proximity range of the user. Preferably, the tag is an electronic circuit including wireless transceiver, such as Bluetooth chip, and certain embedded software or application. The tag may further equipped with a small battery or any other portable current source powers that packaged into any suitable shape or form, including stand-alone device for attachment to any item such as personal belonging, pet, children, etc. that needs to be monitored within a specific distance from the user.

It will be appreciated that the system implemented applications (NODE-APP) that are pre-installed by the manufacturer, or downloaded and installed by end users. The NODE-APP may include GPS or Location Services or any other Mobile position determination technology application that is needed in the observing device to handle the Bluetooth connection.

In use, the NODE-APP first identifies the observing device GPS location or geographical coordinates and the user identifies the "safe zone" by using the NODE-APP of the observing device for activating location. The NODE-APP requires user to confirm setting "safe zone" and to define or choose desired proximity or the distance in radius from the GPS location or the determined geographical coordinates, which encompasses an area in a selected radius according to the user needs.

When the user with the observing device moves away from the NODE or vice versa, the NODE-APP will first identify its GPS location or its geographical coordinates. If the user is within the proximity or perimeter of the "safe zone", the NODE-APP will not trigger alert to the user. Should the user with the observing device moving away from the NODE, and beyond the "safe zone" the NOPE-APP will then trigger alert to the user.

When the user goes to a new location where the user does not pre-define as "safe zone", the NODE-APP will alert the user should the user with the observing device moves away from the NODE.

It will be appreciated that the user has a choice to set or define a temporary "safe zone" where the NODE-APP allows proximity or perimeter around the new GPS location or geographical coordinates to be set or defined as temporary "safe zone". Once the user with the observing device moves beyond the temporary "safe zone" from the NODE, the NODE-APP will automatically remove the temporary "safe zone".

In accordance with the preferred embodiment, the infrastructure for the system further includes at least one timer.

It is to be noted that the wireless alerting system of the present invention is also applicable for "time zone" monitoring, wherein the "time zone" is a time interval set by the user when the user with the observing device moves beyond the "safe zone", the alert to the user will not trigger. Accordingly, the "time zone" is activated by the user by defining specific time line or interval for the user with the observing device moves beyond the predefined "safe zone", the alert to the user will not trigger. It will be appreciated that the "time zone" activation is operated by NODE-APP, wherein the NODE-APP allows user to set the "time zone" with time interval information such as day(s) of the week and to be stored into the observing device for managing, monitoring and alerting features within the system.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

The present invention relates to an improved smart alerting system for safe zone, and more particularly to a wireless alerting system for personal area asset supervision. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The present invention generally utilizes programmable wireless transceiver modules to generate a two or three-dimensional secure personal area in radius, which is known as "safe zone", depending on the implementation chosen and the conditions and obstructions present in the surroundings. The present invention preferably includes one or more identifier devices such as tag, and an observing device such as mobile phone, which is preferably implemented in the form of software application in a suitable host apparatus such as Bluetooth as further described. It will be appreciated that any associated identifier device can be searched or tracked within a selected proximity range of the user. The observing device provides infrastructure for the system such as power supply and a user interface. The observing device may include, for example, but not limited to a Bluetooth-enabled cellular phone, smart phone, laptop, tablet computer or the like. Accordingly, should a tagged item or observing device goes out of the selected proximity range or "safe zone" for whatever reason, an alert will be triggered. The user interface of the observing device may include, for example, one or more of the following: visual monitor or display, audible signal, or vibration signal. In the preferred embodiments of the present invention, the system involves using an application (named as NODE-APP) and a specific identifier (named as NODE) which are connected and in communication to each other using Bluetooth technology.

Figure 1:
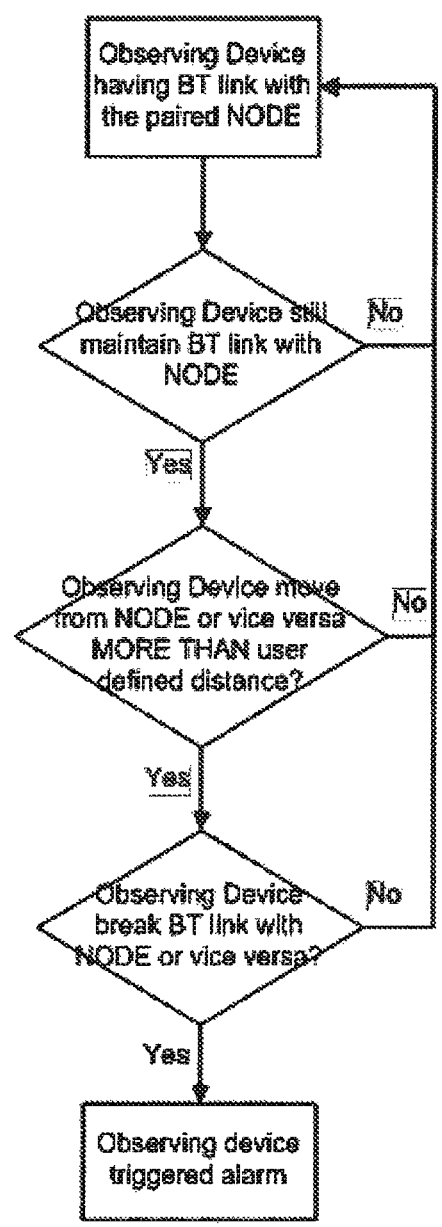
FIG. 1 is an example of a conventional or existing market solution of a wireless alerting system.
Figure 2:
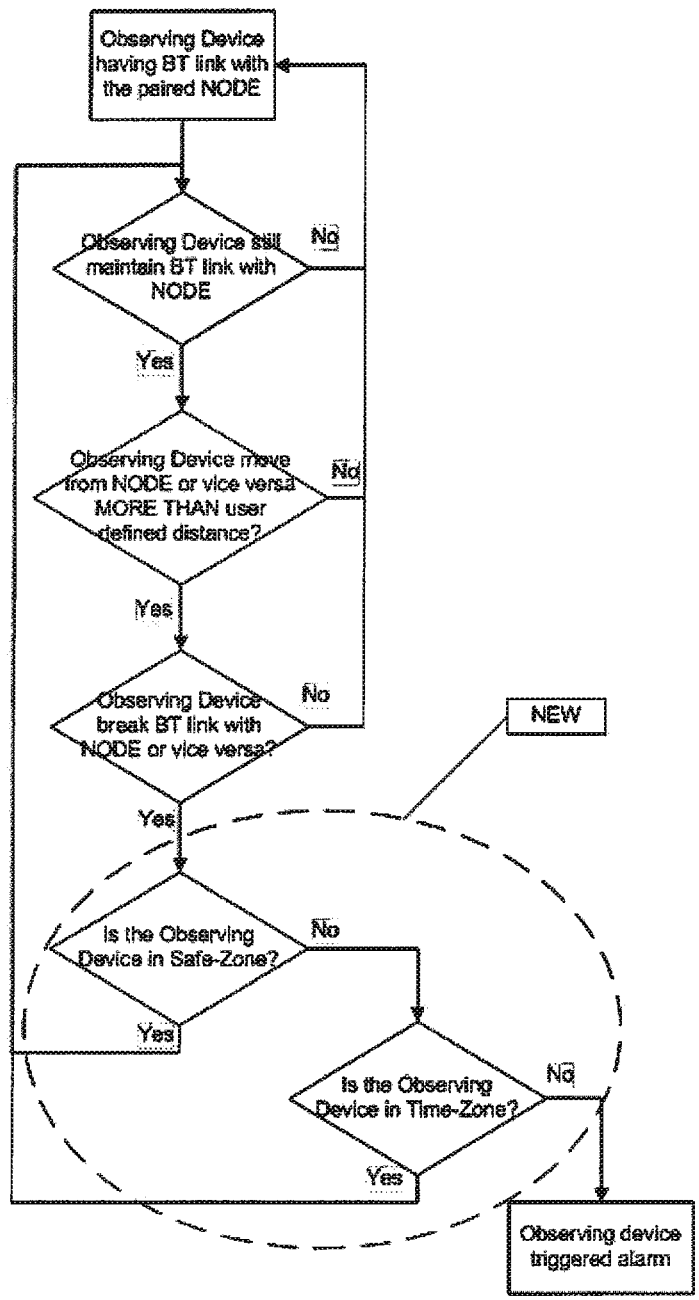
FIG. 2 is a simplified block diagram providing an overview of an example of a wireless alerting system embodying the invention.

The flow diagram shown in FIGS. 1 and 2 representing the difference between the conventional or existing market solution of wireless alerting system and the improved smart alerting system of present invention. Accordingly, FIG. 1 depicts an overview of one conventional or existing market solution of a wireless alerting system, whereas FIG. 2 is a simplified block diagram providing an overview of an example of a wireless alerting system embodying the invention. It is to be noted that new features such as "safe zone" and "time zone" have been introduced in the improved smart alerting system.

Figure 3:
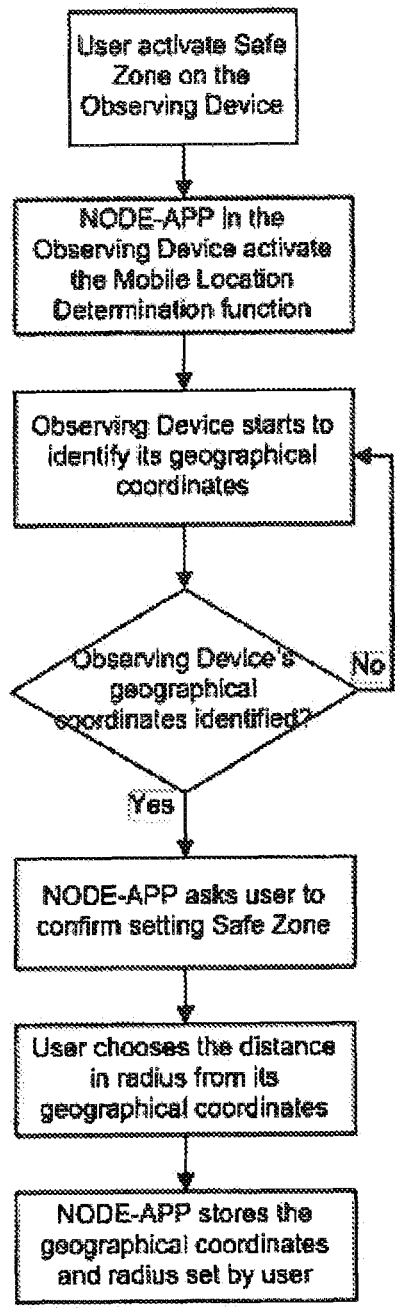
FIGS. 3 and 4 are flow diagram illustrating example of operation for "safe zone" in accordance with preferred embodiments of present invention.
Figure 3:
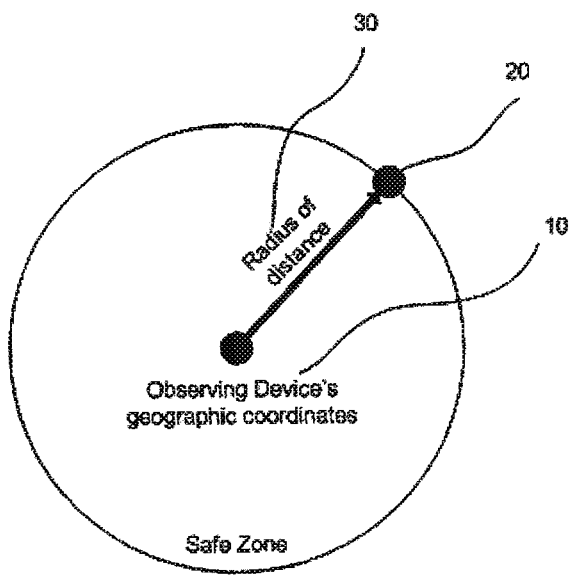
Figure 4:
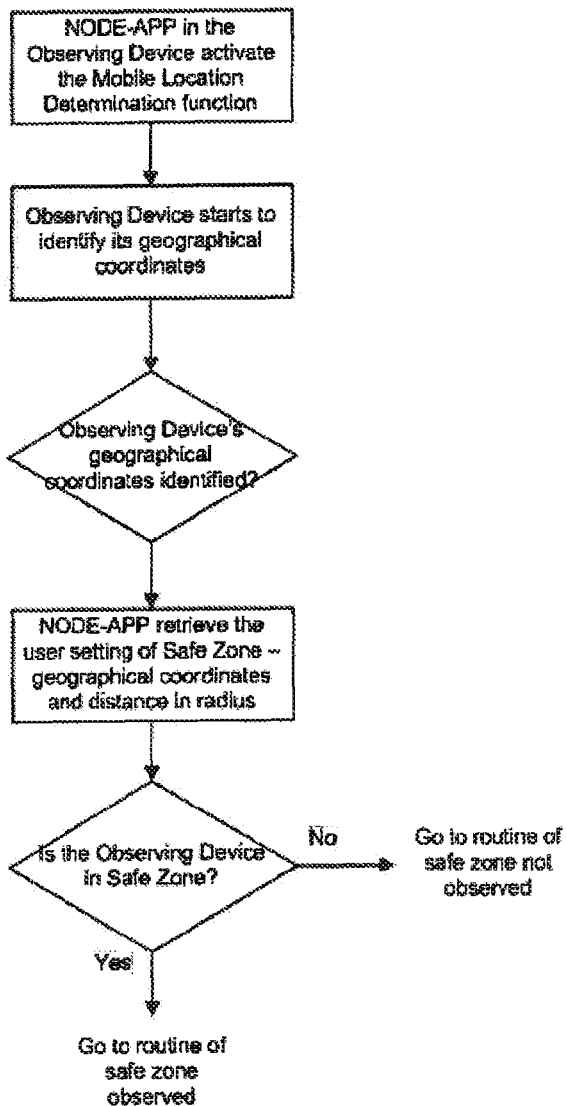
Figure 4:
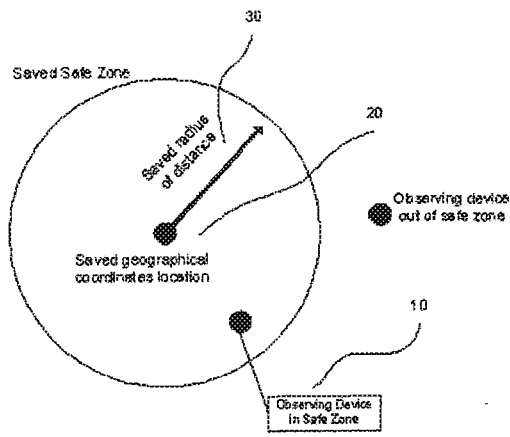
Figure 5:
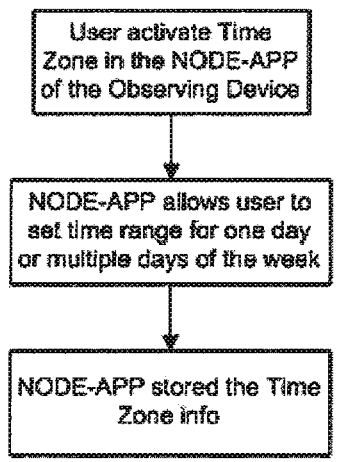
FIG. 5 is a flow diagram illustrating example of operation for "time zone" activation in accordance with preferred embodiments of the present invention.

The improved smart alerting system for safe zone according to the preferred embodiments of the present invention will now be described in accordance to the accompanying drawings FIGS. 3 to 5, both individually and in any combination thereof.

In the preferred embodiments, the smart alerting system includes an observing device (10) such as smart phone, using a host apparatus such as Bluetooth, capable of monitoring one or more identifier devices (20) such as tag, located within a certain proximity (30), which may encompass an area in a selected radius of distance.

Software capabilities are preferably provided in the observing device (10) and/or identifier device(s) (20) for managing, monitoring and alerting features within the system. It is to be noted that the system is preferably implemented as a set of software instruction through observing device, such as for example, but not limited to Bluetooth-enabled cellular phone, smart phone, laptop, tablet computer or the like, residing with the host apparatus, i.e. the Bluetooth. In accordance with the preferred embodiments, the system involves application (hereinafter referred to as NODE-APP) and tag (Hereinafter referred to as NODE) which are connected and in communication to each other using Bluetooth technology. Preferably, the NODE is in communication with the observing device (10) using the Bluetooth technology of version 2.0 or above.

The identifier device(s) (20) may be a generic tag or customized to some extent in the system. Preferably, the tag may be an electronic circuit including wireless transceiver, such as Bluetooth chip, and certain embedded software or application. The tag may be equipped with a small battery or any other portable current source powers that packaged into any suitable shape or form, including stand-alone device for attachment to any item, such as for example, personal belonging, pet, children, etc. that needs to be monitored within a specific distance from the user.

The NODE-APP may be implemented in various ways on different cellular phone or smart phone platforms and environments consistent with the principle of the present invention, provided that they are adapted to perform essentially the searching, tracking, monitoring and alerting functions.

Referring now to the flow diagram of FIGS. 3 and 4, the improved smart alerting system flow for "safe zone" will now be described. The system according to the present invention may be implemented by pre-installing in the observing device (10) by the manufacturer, or may be downloaded and installed by end users. Preferably, main display of the observing device (10) is adapted for reading stored user-selected information from a memory or storage. The displayed data from NODE-APP may include a list of entries representing selected remote Bluetooth device and tag for monitoring. Each entry may contain the tag address, a user friendly description or name of the tag device, and alert sound, visual display signal, or mechanical vibration alerting signal selected for particular tag.

Accordingly, the suitable NODE-APP such as GPS or Location Service or any other Mobile position determination technology application is needed in the observing device (10) to handle the Bluetooth connection. While the NODE, i.e. the tag is in BT connection with the observing device (10), the NODE-APP is able to retrieve the signal strength of the NODE. This signal strength will represent the distance between the NODE and the observing device (10). Accordingly, the nearer of the NODE and the observing device (10), the stronger will be the signal strength.

In the preferred embodiments, the NODE-APP will first use the observing device's (10) location service to identify its GPS location or geographical coordinates. Accordingly, the user may first activate the "safe zone" by using the NODE-APP of the observing device (10) for activating location. By doing so, the observing device (10) starts to identify its location. Should the GPS location or geographical coordinates of the observing device (10) has been identified, NODE-APP will require user to confirm setting "safe zone" and to define or choose desired proximity (30) or the distance in radius from the GPS location or geographical coordinates, which may encompass an area in a selected radius according to the user needs. The data will then be stored in the observing device (10). It will be appreciated that the observing device (10) with location service activated may utilize, but not limited to GPS, A-GPS or WiFi to identify its GPS location or geographical coordinates. The NODE-APP serves to access this feature and to obtain the observing device (10) UPS location or geographical coordinates.

When the user with the observing device (10) moves away from the NODE or vice versa, the NODE-APP will first identify its GPS location or geographical coordinates. If the user is within the proximity (30) or perimeter of the "safe zone", the NODE-APP will not trigger alert to the user. Thus, the user will not be disturbed as long as he/she moves within the perimeter of the "safe zone". Should the user with the observing device (10) moves away from the NODE, and beyond the "safe zone" the NOPE-APP will then trigger alert to the user. It is to be noted that when the user goes to a new location where the user does not pre-define as "safe zone", the NODE-APP will alert the user should the user with the observing device (10) moves away from the NODE. It will be appreciated that the user has a choice to set or define a temporary "safe zone" where the NODE-APP allows proximity (30) or perimeter around the new GPS location or geographical coordinates to be set or defined as temporary "safe zone", Once the user with the observing device (10) moves beyond the temporary "safe zone" from the NODE, the NODE-APP will automatically remove the temporary "safe zone".

It is to be noted that the improved smart alerting system also applicable for "time zone" monitoring wherein the "time zone" defined herein is a time interval set by the user when the user with the observing device (10) moves beyond the "safe zone", the alert to the user will not trigger. FIG. 5 shows a flow diagram illustrating example of operation for "time zone" activation in accordance with preferred embodiments of the present invention. Accordingly, the user may activate the "time zone" through the NODE-APP by defining specific time line or interval for the user with the observing device (10) moves beyond the predefined "safe zone", the alert to the user will not trigger. The flow diagram and table in FIG. 5 shows an example, but not limited to flow of the "time zone" activation. In the preferred embodiments, the "time zone" activation is operated by NODE-APP, wherein the NODE-APP allows user to set the "time zone" with time interval information such as days) of the week and to be stored into the s observing device (10).

The invention being thus described, it will be obvious that the same may be varied in many ways. Such variations are not to be regarded as a departure from the principle and scope of the invention, and all such modifications as would obvious to one skilled in the art intended to be included within the scope of following claims.

The invention claimed is:

1. A wireless alerting system for personal area asset supervision, the system comprising:
   an observing device;
   at least one identifier device; wherein the observing device is adapted to monitor the at least one identifier device located within a selected proximity that encompasses an area in a selected radius of distance;
   wherein the observing device provides infrastructure for the system including a power supply and a user interface;
   wherein the identifier device is a generic tag or is customized to some extent in the system for attachment to any item; and
   wherein the system further comprises a smart phone application (named as NODE-APP) provided in the observing device and the at least one identifier device (named as NODE) that are connected and in communication with each other using Bluetooth technology; wherein said NODE-APP includes GPS or Location Services or any other mobile position determination technology application that enables identification of the GPS location or geographical coordinates of the observing device, such that a user is enabled to pre-define a "safe zone" that is in a selected proximity range or within an area encompassed by a selected radial distance from the GPS location or the determined geographical coordinates, and wherein when the user with the observing device moves away from the NODE or vice versa, the NODE-APP will first identify the GPS location or geographic coordinates of the observing device; and if the user is within the proximity range or a perimeter of the "safe zone", the NODE-APP will not trigger an alert to the user; and when the user with the observing device is moving away from the NODE or beyond the perimeter of the "safe zone", the NODE-APP will then trigger an alert to the user.

2. The wireless alerting system claimed in claim 1, wherein the observing device is a Bluetooth-enabled cellular phone, smart phone, laptop, or tablet computer.

3. The wireless alerting system claimed in claim 1, wherein the user interface of the observing device comprises one or more of a visual monitor or display, an audible signal, or a mechanical vibration signal.

4. The wireless alerting system claimed in claim 1, wherein the system further comprises software capabilities provided in the observing device and/or the at least one identifier device for managing, monitoring and alerting features within the system.

5. The wireless alerting system claimed in claim 1, wherein the system is implemented as a set of software instructions through the observing device.

6. The wireless alerting system claimed in claim 1, wherein the NODE is in communication with the observing device using Bluetooth technology of version 2.0 or above.

7. The wireless alerting system claimed in claim 1, wherein the at least one identifier device is searchable or trackable within the selected proximity range of the user.

8. The wireless alerting system claimed in claim 1, wherein the tag is an electronic circuit including a wireless transceiver, such as a Bluetooth chip, and embedded software or application.

9. The wireless alerting system claimed in claim 8, wherein the tag is further equipped with a battery or any other portable current source that is packaged into any suitable shape or form, wherein the shape or form comprises a stand-alone device for attachment to any selected item.

10. The wireless alerting system claimed in claim 9, wherein the item is a personal belonging, a pet, or a child that needs to be monitored within a specific distance from the user.

11. The wireless alerting system claimed in claim 1, wherein the NODE-APP is pre-installed by a manufacturer, or is downloaded and installed by the user.

12. The wireless alerting system claimed in claim 1, wherein when the user moves with the observing device to a new location that the user has not pre-defined as the "safe zone", the NODE-APP will alert the user when the user moves away from the NODE.

13. The wireless alerting system claimed in claim 12, wherein the user has a choice to set or define a temporary "safe zone" where the NODE-APP allows a proximity or a perimeter around a new GPS location or geographical coordinates to be set or defined as the temporary "safe zone"; and once the user with the observing device moves beyond the temporary "safe zone" and away from the NODE, the NODE-APP will automatically remove the temporary "safe zone".

14. The wireless alerting system claimed in claim 1, wherein the system further comprises at least one timer.

15. The wireless alerting system claimed in claim 14, wherein the system is applicable for "time zone" monitoring, wherein the "time zone" is activated by the user defining a specific time line or interval for the observing device to move beyond the "safe zone" without triggering an alert to the user.

16. The wireless alerting system claimed in claim 15, wherein the NODE-APP allows user to set the "time zone" with time interval information such as day(s) of the week and to store the time interval information in the observing device.

* * * * *